United States Patent
Oxford

Patent Number: 5,333,023
Date of Patent: Jul. 26, 1994

[54] CAMERA QUICK RELEASE

[76] Inventor: Jerry J. Oxford, 61 Jordan Ct., Lawrenceville, Ga. 30244

[21] Appl. No.: 955,642

[22] Filed: Oct. 2, 1992

[51] Int. Cl.$^5$ .............................................. G03B 29/00
[52] U.S. Cl. ...................................... 354/81; 354/293; 403/71; 403/375; 248/222.1; 292/304
[58] Field of Search .................... 354/81, 293, 294; 352/243; 403/330, 325, 375, 71; 248/177, 222.1; 292/304, 204, 207

[56] References Cited

U.S. PATENT DOCUMENTS

| | | | |
|---|---|---|---|
| 3,356,325 | 12/1967 | Schnase | 354/293 X |
| 5,222,826 | 6/1993 | Hanke | 354/293 X |

*Primary Examiner*—Howard B. Blankenship
*Attorney, Agent, or Firm*—James A. Hinkle

[57] ABSTRACT

A camera quick release tripod fastener has a fastener housing (2) with a cylindrical stud bearing (10) into which a fastener stud (1) is positioned in rotational relationship to the fastener housing. The fastener stud has a circumferential attachment groove (6) between a rotational adjustment end (5) and a camera attachment end (4). An attachment lever (6) is attached pivotally to the fastener housing and positioned for pivotal entry into and exit from the circumferential attachment groove for respectively quick release containing and releasing of the fastener stud to which a camera is attachable at the camera attachment end. An adjustment end wall (7) of the circumferential attachment groove is beveled to provide an inclined conical slope against which the attachment lever is positioned snugly to tighten the rotational adjustment end of the fastener stud against an bottom wall (9) of the cylindrical stud bearing. Radial serrations (28) in the end wall of the cylindrical stud bearing and matching radial serrations (29) on the end of the fastener stud provide rigid rotational adjustment with the attachment lever positioned snugly against the conical slope of the attachment side wall of the attachment groove. A camera attachment bolt (18) on the camera attachment end of the fastener stud is screwed into a threaded attachment orifice of a particular camera. A tripod side of the fastener housing has a plurality of internally threaded bolt hole orifices (19, 20) into which differently sized tripod attachment bolts are screwable.

16 Claims, 2 Drawing Sheets

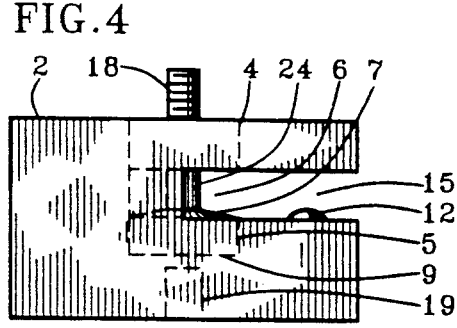
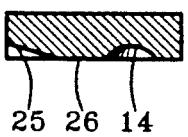
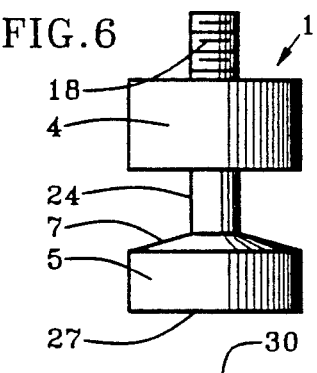
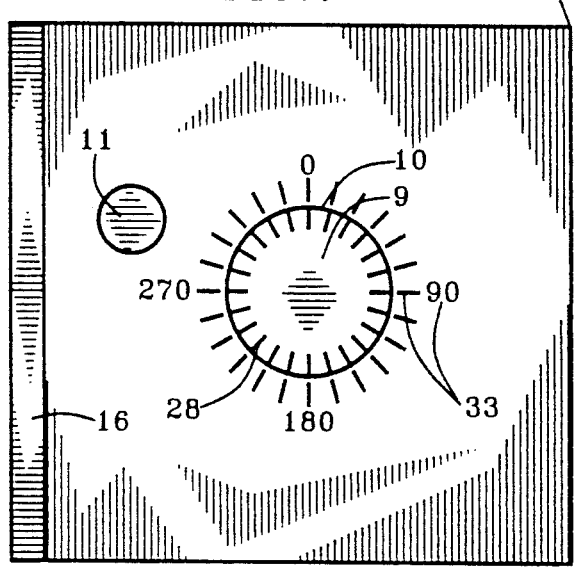
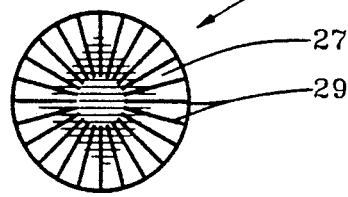
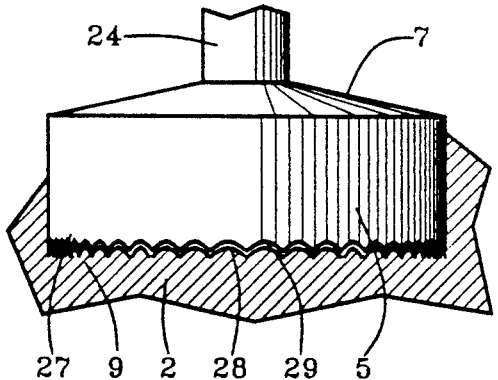
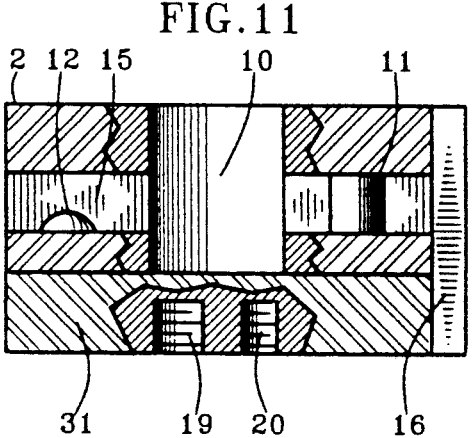
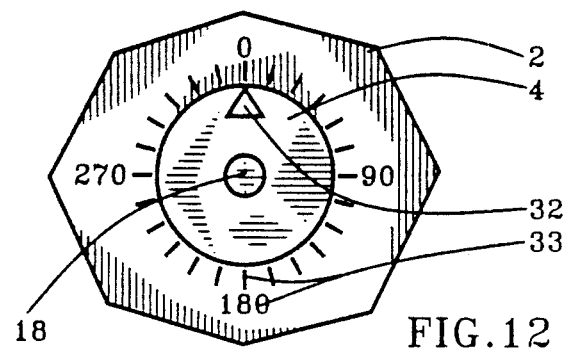

CAMERA QUICK RELEASE

BACKGROUND OF THE INVENTION

I. Field of the Invention

The present invention relates generally to the field of fasteners for quick release attachment of a camera to a camera tripod or other camera stand, or lighting equipment.

II. Description of the Prior Art

Currently, cameras are attached to tripod stands by threading an externally threaded fastener bolt on a top surface of a tripod stand into an internally threaded fastener orifice in a bottom surface of the camera. The camera, or an internally threaded machine nut on the camera, is rotated in one direction to attach the camera to the tripod and rotated in the opposite direction to remove it from the tripod. A tripod is intended to indicate any type of camera stand with which this invention can be used.

Although this current attachment method is functionally reliable and rigid, there are certain problems with it. Fit of a camera to a tripod is limited to fit of the internally threaded orifice in the camera to the externally threaded bolts on particular tripods. Tripods are not interchangeable for attachment of cameras with different fastener threading. Considerable time and distraction is required for putting a camera onto a tripod and taking it off for set-up and movement for photographic changes. In addition, rotation of the camera on the tripod often loosens the attachment and causes camera shake.

SUMMARY OF THE INVENTION

In accordance with the present invention, it is contemplated that one object of this invention is to provide a camera quick release fastener that allows a wide variety of cameras to fit onto a wide variety of tripods.

Another object is to provide quick and easy attachment of cameras to tripods and quick and easy removal of cameras from tripods for convenient set-up and movement of cameras and tripods for professional photographic activities.

Another object is to provide precise, easy and quick rotational setting of cameras on tripods.

This invention accomplishes the above and other objectives with a camera quick release tripod fastener having a fastener housing with a cylindrical stud bearing into which a fastener stud is positioned in rotational relationship to the fastener housing. The fastener stud has a circumferential attachment groove between a rotational adjustment end and a camera attachment end. An attachment lever is attached pivotally to the fastener housing and positioned for pivotal entry into and exit from the circumferential attachment groove for respectively quick release containing and releasing of the fastener stud to which a camera is attachable at the camera attachment end. An adjustment side wall of the circumferential attachment groove is beveled to provide an inclined conical slope against which the attachment lever is positioned snugly to tighten the rotational adjustment end of the fastener stud against an end wall of the cylindrical stud bearing. Radial serrations in the end wall of the cylindrical stud bearing and matching radial serrations on the end of the fastener stud provide rigid rotational adjustment with the attachment lever positioned snugly against the conical slope of the attachment side wall of the attachment groove. A camera attachment bolt on the camera attachment end of the fastener stud is screwed into a threaded attachment orifice of a particular camera. A tripod side of the fastener housing has a plurality of internally threaded orifices into which differently sized tripod attachment bolts may be located.

Other objects, advantages and capabilities of the invention will become apparent from the following description taken in conjunction with the accompanying drawings showing preferred embodiments of the invention.

BRIEF DESCRIPTION OF THE DRAWINGS

FIG. 4 is a front view with an attachment lever removed;

FIG. 5 is a cross-sectional view of the attachment lever at an indentation for a detent;

FIG. 6 is an elevation view of a fastener stud;

FIG. 7 a top view with the fastener lever removed to illustrate radial serrations in a bottom wall of a cylindrical stud bearing;

FIG. 8 is a side view of an optional end lock plate;

FIG. 9 is a bottom view of the fastener stud with radial serrations to match the radial serrations in the bottom wall of the cylindrical stud bearing;

FIG. 10 is a cutaway sectional view of a rotational adjustment end of the fastener stud with radial serrations rotation fixed relationship to radial serrations in the bottom wall of the cylindrical stud bearing;

FIG. 11 is a cutaway left side with the fastener lever removed; and

FIG. 12 is a sectional view of directional indices on top of the fastener housing and fastener stud.

DESCRIPTION OF THE PREFERRED EMBODIMENTS

Figure 1:
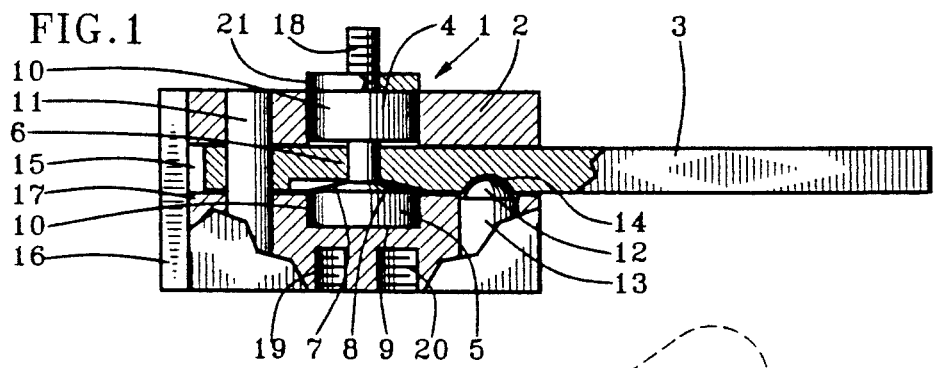
FIG. 1 is a vertical section right side view.

Referring to the drawings wherein like reference numerals designate corresponding parts throughout the several figures, FIG. 1 shows a fastener stud 1 held snugly in a fastener housing 2 by an attachment lever 3. On the fastener stud 1 are a camera attachment end 4 and a rotational adjustment end 5. Between the camera attachment end 4 and the rotational adjustment end 5 is a circumferential attachment groove 6 having an adjustment end wall 7 with a conical slope against which a lever bevel 8 on the attachment lever 3 is positioned snugly to fit the rotational adjustment end 5 of the fastener stud 1 snugly against a bearing bottom wall 9 of a cylindrical stud bearing 10. The attachment lever 3 is pivotal on a lever pin 11 having an axis parallel to the stud bearing 10 for pivotal travel in and out of the attachment groove 6. The lever bevel 8 on the attachment lever 3 is held snugly against the slope on the adjustment end wall 7 of the attachment groove 6 by a detent latch 12 in a spring loaded detent 13 that pressures the detent latch 12 into a detent indentation 14 in the attachment lever 3. Excessive pivotal travel of the attachment lever 3 in a lever channel 15 is arrested by a lever restraint wall 16 that can be attached to or built onto the fastener housing 2 at a base end 17 of the fastener housing 2.

Cameras are attached to a camera attachment bolt 18 on the camera attachment end 4 of the fastener stud 1. Tripods or other camera holding bases are attached to a relatively small tripod attachment bolt hole 19, to a relatively large tripod attachment bolt hole 20 or to such other bolt holes as may be provided for attachment to various sizes of tripods or other camera holding bases. A lock washer 21 with a selectively cushioning construction can be provided to prevent turning of a camera on the camera attachment bolt 18 and simultaneously protect a contact surface on a camera.

Figure 2:
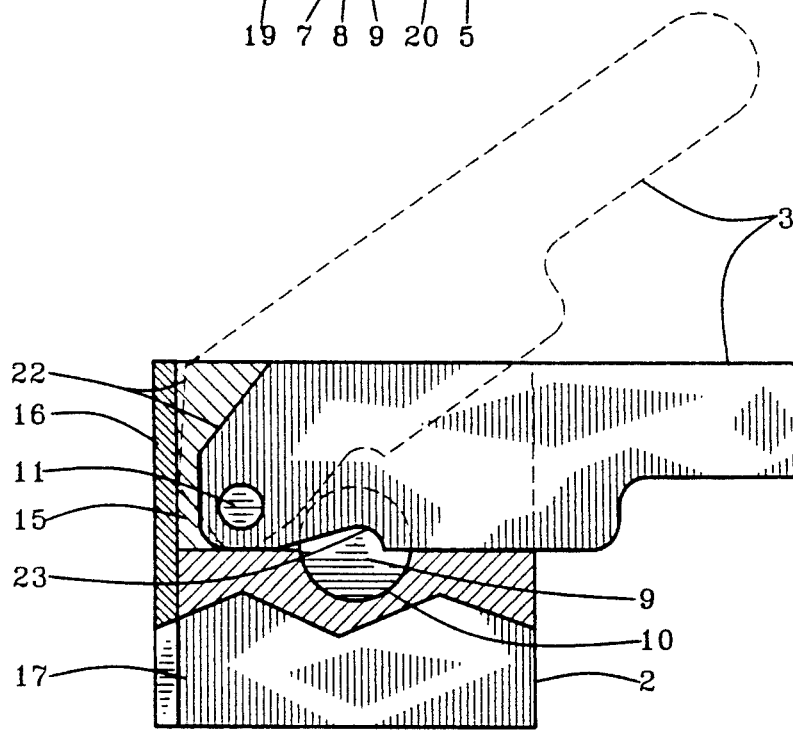
FIG. 2 is a cutaway top view.

Referring to FIGS. 1 and 2, a lever shoulder 22 can be seen resisting excessive pivotal travel of the attachment lever 3 when buttressed against the lever restraint wall 16 in a top view. The fastener stud 1 is removed from the cylindrical stud bearing 10 in this view to illustrate a groove curve 23 in the attachment lever 3. It is at this groove curve 23 where the lever bevel 8 contacts the conical surface of the adjustment end wall 7 of the attachment groove 6 in the fastener stud 1. Pivotal travel of the attachment lever 3 on the lever pin 11 within the lever channel 15 is illustrated also in this view.

Figure 3:
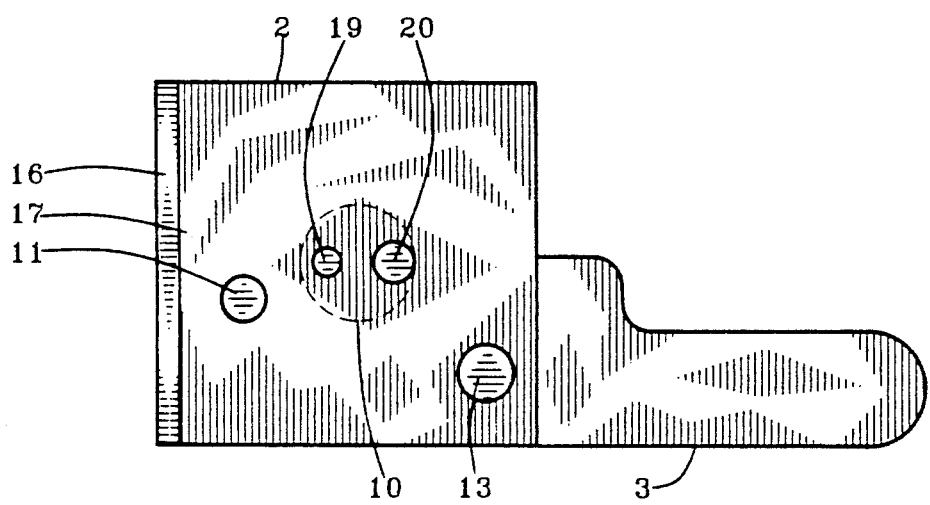
FIG. 3 is a bottom view.

Referring to FIGS. 1 and 3, the relatively small tripod attachment bolt holes 19 and the relatively large tripod attachment bolt holes 20 can be seen in relationship to the lever pin 11, the spring loaded detent 13 and the lever 3 in this bottom view. The cylindrical stud bearing 10 that opens in the top of the fastener housing 2 is shown in a broken line.

Referring to FIGS. 1 and 4, the lever channel 15 without the attachment lever 3 and the lever restraint wall 16 reveals the detent latch 12, the adjustment end wall 7 of the attachment groove 6 and an attachment groove bottom cylinder 24 in this front view. The fastener stud 1 with camera attachment end 4 and rotational adjustment end 5 in cylinder stud bearing 10 are shown in broken lines. Tripod attachment bolt hole 19 or 20 is shown in broken lines to extend to a position sufficiently removed from the bearing bottom wall 9 of the cylindrical stud bearing 10. If desired for construction cost reduction in a less preferred embodiment, the bolt holes 19 and 20 could penetrate the bearing bottom wall 9. The camera attachment bolt 18 is shown extended from the camera attachment end 4 of the fastener stud 1 without the lock washer 21 attached. The detent latch 12 can be spherical or hemispherical as shown.

Referring to FIGS. 1, 4 and 5, in a cross section of the attachment lever 3, the detent orifice 14 can be seen to be positioned near an opposite side of the attachment lever 3 from a latch depression bevel 25. This allows the detent latch 12 to be depressed easing and then to provide pressure against a lever bottom surface 26 for a lever positioning "feel" before and after the detent latch 12 is bottomed in the detent indentation 14. Snug spring pressure fit of the detent latch 12 in the detent indentation 14 assures snug fit of the lever bevel 8 against the conical surface of the adjustment end wall 7 of the attachment groove 6. This snug fit then assures snug fit of the fastener stud 1 against the bearing bottom wall 9 to resist rotation of the fastener stud 1.

Referring to FIG. 6, the fastener stud 1 is shown separately in an expanded view to illustrate a stud bottom surface 27 separately for rotation resistant features. Variations of serration locking means and friction locking means are employed. The serration locking means are preferable.

Referring to FIGS. 16–10 primarily and to FIGS. 1–5 secondarily, radial cylinder serrations 28 are formed in the bearing bottom wall 9 and radial stud serrations 29 are formed in the stud bottom surface for a preferred embodiment of this invention. The serrations 28 and 29 fit between each other in juxtaposed relationship as shown in FIG. 10 when the fastener stud 1 is pressured downwardly by positioning of the lever bevel 8 against the conical adjustment end wall 7 of the attachment groove 5. This locks the fastener stud 1 rotationally to prevent a camera attached to the fastener stud 1 from rotating in relationship to the fastener housing 2 and a camera base or tripod attached to the fastener housing 2. The serrations 28 and 29 can be constructed in a variety of shapes and sizes as long as they intermesh with each other. Also, the number of serrations 28 can be different from the number of serrations 29 as long as circular angles between them are proportioned for fit of some of either between the other. Equal numbers of each of the serrations 28 and 29 is preferable, however.

Optionally, a resilient lock washer or lock plate 30, shown in FIG. 8, can be positioned between the stud bottom surface 27 of the rotational adjustment end 5 of the fastener stud 2 and the bearing bottom wall 9 of the cylindrical stud bearing 10. The resilient lock washer can be used with or without serrations 28 and 28. It has the advantage of greater flexibility of rotational setting and the disadvantage of less reliability of the rotational setting.

Referring to FIG. 11, the fastener housing 1 can have a separate tripod attachment section 31 that is attachable to the fastener housing at a plane parallel to the bearing bottom wall 9. This allows access to the bearing bottom wall 9 for ease of fabricating the radial cylinder serrations 28. It is a construction option that also makes the tripod attachment bolt holes 19 and 20 easier to machine. It also makes this invention more broadly adaptable to various camera bases. A tripod attachment section 31 with a single tripod attachment bolt hole 18 or 19 can be changed easily to one with another size of bolt hole 18 or 19 or to one with a plurality of bolt holes 18 and 19. This versatility can be most useful for volume production of components that are assembled according to volume orders and demand conditions. The left side view shows the cylindrical stud bearing 10 as being formed circumferentially on both sides of lever channel 15 where a half circle circumference exists.

Referring further to FIG. 7 and to FIG. 12, precise angles of rotation of a camera can be shown by an arrow 32 on top of the camera attachment end of the fastener stud 4. The arrow 32 can be referenced to degree indices 33 on top of the fastener housing 2.

Various modifications may be made of the invention without departing from the scope thereof and it is desired, therefore, that only such limitations shall be placed thereon as are imposed by the prior art and which are set forth in the appended claims.

What is claimed is:

1. A camera quick release tripod fastener comprising:

a fastener housing having a cylindrical stud bearing positioned in a camera attachment surface of the fastener housing, a fastener stud with a rotational adjustment end and a camera attachment end having cylindrical walls with circumferential outside peripheral surfaces positioned in rotational contact with inside cylindrical bearing walls of the cylindrical stud bearing, a circumferential attachment groove having a camera end wall and a rotational adjustment end wall between the camera attachment end and the rotational adjustment end of the fastener stud, an attachment lever pivotally attached to the fastener housing at a position in which the attachment lever is pivotal in and out of the circumferential attachment groove on a lever pivot axis parallel to the cylindrical stud bearing, a lever channel in which the attachment lever is pivotal in and out of the circumferential attachment groove, a camera attachment boss on the camera attachment end of the fastener stud, and at least one tripod attachment bay in a tripod attachment surface of the fastener housing.

2. A camera quick release tripod fastener as claimed in claim 1 and further comprising:

a conical surface on the rotational adjustment end wall of the circumferential attachment groove with a beveled surface extended circumferentially from an outside peripheral surface of the rotational adjustment end of the fastener stud to a groove bottom at a circumferential groove bottom section of the fastener stud.

3. A camera quick release tripod fastener as claimed in claim 2 and further comprising:

a stud contact surface on the attachment lever that is beveled reciprocally to match the conical surface of the rotational adjustment end wall of the circumferential attachment groove in the fastener stud such that an end wall of the rotational adjustment end of the fastener stud is positioned in snug contact with an end wall of the cylindrical stud bearing when the stud contact surface on the fastener lever is in snug contact with the conical surface on the rotational adjustment end wall of the circumferential attachment groove in the fastener stud.

4. A camera quick release tripod fastener as claimed in claim 3 and further comprising:

a lever detent having a lever contact member pressured against a surface of the attachment lever from a base position on the fastener housing, and a detent indentation at a position in the attachment lever in which the lever detent is bottomed in the detent indentation when the stud contact surface on the attachment lever is in snug contact with the conical surface of the rotational adjustment end wall of the circumferential attachment groove in the fastener stud.

5. A camera quick release tripod fastener as claimed in claim 4 and further comprising:

radial stud serrations positioned at equal angles of separation circumferentially on the end wall of the rotational adjustment end of the fastener stud, radial bearing serrations positioned at angles of separation circumferentially on the end wall of the cylindrical stud bearing that are equal to the equal angles of separation of the radial serrations on the end wall of the rotational adjustment end of the fastener stud, and the radial stud serrations and the radial bearing serrations are sized, shaped and positioned for fit of separate radial stud serrations between separate radial bearing serrations when the end wall of the rotational adjustment end of the fastener stud is positioned snugly against the end wall of the cylindrical stud bearing by means of snug contact of the stud contact surface on the attachment lever and the conical surface of the rotational adjustment end wall of the circumferential attachment groove in the fastener stud.

6. A camera quick release tripod fastener as claimed in claim 3 and further comprising:

a resilient lock washer positioned between the end wall of the rotational adjustment end of the fastener stud and the end wall of the cylindrical stud bearing.

7. A camera quick release tripod fastener as claimed in claim 1 and further comprising:

a tripod attachment section of the fastener housing that is separable from and attachable to a camera attachment side of the fastener housing at a position proximate the end wall of the cylindrical stud bearing such that the end wall of the cylindrical stud bearing can be accessed for surface preparation during production.

8. A camera quick release tripod fastener as claimed in claim 6 and further comprising:

a plurality of tripod attachment bays in the tripod attachment section of the fastener housing having separately sized and internally threaded cylindrical walls for threading attachment of select tripods to the fastener housing.

9. A camera quick release tripod fastener as claimed in claim 1 and further comprising:

a resilient lock washer positioned between a camera bottom and a top surface of the fastener stud circumferentially at an outside periphery of an outside diameter threaded camera attachment boss on the camera attachment end of the fastener stud.

10. A camera quick release tripod fastener as claimed in claim 1 and further comprising:

an attachment lever abutment wall positioned on an end of the lever channel such that pivotal travel of the attachment lever is arrested thereby at a desired pivotal position.

11. A camera quick release tripod fastener comprising:

a fastener housing having a cylindrical stud bearing positioned in a camera attachment surface of the fastener housing, a fastener stud with a rotational adjustment end and a camera attachment end having cylindrical walls with circumferential outside peripheral surfaces positioned in rotational contact with inside cylindrical bearing walls of the cylindrical stud bearing, a circumferential attachment groove having a camera end wall and a rotational adjustment end wall between the camera attachment end and the rotational adjustment end of the fastener stud, an attachment lever pivotally attached to the fastener housing at a position in which the attachment lever is pivotal in and out of the circumferential attachment groove on a lever pivot axis parallel to the cylindrical stud bearing, a lever channel in which the attachment lever is pivotal in and out of the circumferential attachment groove, a camera attachment boss on the camera attachment end of the fastener stud, at least one tripod attachment bay in a tripod attachment surface of the fastener housing, a resilient lock washer positioned on a top surface of the fastener stud circumferentially at an outside periphery of an outside diameter threaded camera attachment boss on the camera attachment end of the fastener stud, a conical surface on the rotational adjustment end wall of the circumferential attachment groove with a beveled surface extended circumferentially from an outside peripheral surface of the rotational adjustment end of the fastener stud to a groove bottom at a circumferential groove bottom section of the fastener stud, a stud contact surface on the attachment lever that is beveled reciprocally to match the conical surface of the rotational adjustment end wall of the circumferential attachment groove in the fastener stud such that an end wall of the rotational adjustment end of the fastener stud is positioned in snug contact with an end wall of the cylindrical stud bearing when the stud contact surface on the fastener lever is in snug contact with the conical surface on the rotational adjustment end wall of the circumferential attachment groove in the fastener stud, a lever detent having a lever contact member pressured against a surface of the attachment lever from a base position on the fastener housing, and a detent indentation at a position in the attachment lever in which the lever detent is bottomed in the detent indentation when the stud contact surface on the attachment lever is in snug contact with the conical surface of the rotational adjustment end wall of the circumferential attachment groove in the fastener stud.

12. A camera quick release tripod fastener as claimed in claim 11 and further comprising:

radial stud serrations positioned at equal angles of separation circumferentially on the end wall of the rotational adjustment end of the fastener stud, radial bearing serrations positioned at angles of separation circumferentially on the end wall of the cylindrical stud bearing that are equal to the equal angles of separation of the radial serrations on the end wall of the rotational adjustment end of the fastener stud, and the radial stud serrations and the radial bearing serrations are sized, shaped and positioned for fit of separate radial stud serrations between separate radial bearing serrations when the end wall of the rotational adjustment end of the fastener stud is positioned snugly against the end wall of the cylindrical stud bearing by means of snug contact of the stud contact surface on the attachment lever and the conical surface of the rotational adjustment end wall of the circumferential attachment groove in the fastener stud.

13. A camera quick release tripod fastener as claimed in claim 12 and further comprising:

a tripod attachment section of the fastener housing that is separable from and attachable to a camera attachment side of the fastener housing at a position proximate the end wall of the cylindrical stud bearing such that the end wall of the cylindrical stud bearing can be accessed for surface preparation during production.

14. A camera quick release tripod fastener as claimed in claim 13 and further comprising:

a plurality of tripod attachment bays in the tripod attachment section of the fastener housing having separately sized and internally threaded cylindrical walls for threading attachment of select tripods to the fastener housing.

15. A camera quick release tripod fastener as claimed in claim 14 and further comprising:

an attachment lever abutment wall positioned on an end of the lever channel such that pivotal travel of the attachment lever is arrested at a desired pivotal position.

16. A camera quick-release tripod fastener as claimed in claim 1 and further comprising:

the fastener housing having angular indices on an upper surface of the fastener housing around the cylindrical stud bearing, the camera attachment end of the fastener stud having an upper surface coplanar with the upper surface of the fastener housing, an index indicator positioned on the camera attachment end of the fastener stud in angular juxtaposition with the indices of the upper surface of the fastener housing, the rotational adjustment end of the fastener stud having a bottom surface, the bottom surface having radial serrations therein, the cylindrical stud bearing bottom wall and further having radial serrations in the bottom wall for cooperatively engaging the radial serrations of the bottom surface of the fastener stud at select times.

* * * * *